United States Patent [19]

Tsubakimoto et al.

[11] Patent Number: 4,471,100

[45] Date of Patent: Sep. 11, 1984

[54] COPOLYMER AND METHOD FOR MANUFACTURE THEREOF

[75] Inventors: Tsuneo Tsubakimoto; Masahiro Hosoido, both of Toyonaka; Hideyuki Tahara, Osaka, all of Japan

[73] Assignee: Nippon Shokubai Kagaku Kogyo Co., Ltd., Osaka, Japan

[21] Appl. No.: 339,640

[22] Filed: Jan. 15, 1982

[30] Foreign Application Priority Data

| Jan. 16, 1981 [JP] | Japan | 56-3776 |
|---|---|---|
| Jan. 20, 1981 [JP] | Japan | 56-5913 |
| Jun. 23, 1981 [JP] | Japan | 56-95928 |
| Jul. 1, 1981 [JP] | Japan | 56-101353 |

[51] Int. Cl.$^3$ ............................................. C08F 8/44
[52] U.S. Cl. .................................. 525/367; 525/368; 525/369; 525/378; 525/379; 525/380; 525/384; 525/385; 526/208; 526/212; 526/216; 526/240; 526/312; 526/317; 526/320; 526/321
[58] Field of Search ............... 526/208, 212, 216, 240, 526/312, 317, 320, 321; 525/367, 368, 369, 378, 379, 380, 384, 385

[56] References Cited

U.S. PATENT DOCUMENTS

| 3,025,267 | 3/1962 | Calfee | 526/332 |
|---|---|---|---|
| 3,135,714 | 6/1964 | Sterling et al. | 524/559 |
| 3,436,378 | 4/1969 | Azorlosa et al. | 526/332 |
| 3,530,167 | 9/1970 | Dowbenko | 526/333 |
| 3,719,647 | 3/1973 | Hardy et al. | 260/86.1 R |
| 3,755,264 | 8/1973 | Testa | 260/78.5 R |
| 3,809,685 | 5/1974 | Sato et al. | 260/80.71 |
| 3,976,614 | 8/1976 | Elms et al. | 260/29.4 UA |
| 4,033,922 | 7/1977 | Baron, Jr. et al. | 260/29.6 RW |
| 4,123,374 | 10/1978 | Gilliams et al. | 252/62.1 L |
| 4,138,381 | 2/1979 | Chang et al. | 260/29.6 TA |
| 4,143,017 | 3/1979 | Tarumi et al. | 260/29.7 H |

Primary Examiner—Joseph L. Schofer
Assistant Examiner—Bernard Lipman
Attorney, Agent, or Firm—Omri M. Behr

[57] ABSTRACT

A copolymer represented by the general formula:

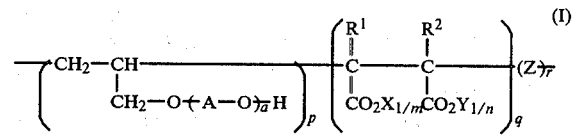

[wherein, A denotes an alkylene group of 2 to 4 carbon atoms, the $+A-O+_a$ chain may have at least one oxy-alkylene unit bonded in any possible order, a denotes an integer of the value of 1 to 100, $R^1$ and $R^2$ independently denote a hydrogen atom or a methyl group, X and Y independently denote a monovalent metal atom, a divalent metal atom, an ammonium group, an organic amine group, or $+B-O+_bR^3$ (wherein, B denotes an alkylene group of 2 to 4 carbon atoms, the $+B-O+_b$ chain may have at least one oxy-alkylene unit bonded in any possible order, b denotes 0 or an integer of the value of 1 to 100, and $R^3$ denotes a hydrogen atom or an alkyl group of 1 to 20 carbon atoms), Z denotes a structural unit derived from a copolymerizable vinyl monomer, m and n each denote 1 where X and Y are each a monovalent metal atom, an ammonium group, an organic amine group, or $+B-O+_bR^3$ or 2 where X and Y are each a divalent metal atom, and p, q, and r denote numbers such that $25 \leq p \leq 75$, $25 \leq q \leq 75$, and $0 \leq r \leq 50$ are satisfied on condition that $p+q+r$ equals 100, and it is provided that the structural units involved herein may be bonded in any possible order].

21 Claims, 15 Drawing Figures

COPOLYMER AND METHOD FOR MANUFACTURE THEREOF

BACKGROUND OF THE INVENTION

1. Field of the Invention

This invention relates to a novel copolymer, a method for the manufacture thereof and uses thereof. More particularly, the invention relates to a copolymer containing in the molecular unit thereof a carboxyl group and/or a salt thereof and further containing therein, as a side chain and in the shape of a comb, an adduct of an alkylene oxide, to a method for the manufacture thereof, and to uses thereof.

2. Description of Prior Arts

Heretofore, polysulfonic acids and salts thereof such as lignosulfonic acid and salts thereof, naphthalenesulfonic acidformaldehyde condensates and salts thereof (German Pat. No. 1,238,831) and sulfonated melamine resins and salts thereof, oxycarboxylic acids and salts thereof such as gluconic acid and salts thereof and glucoheptonic acid and salts thereof, and mixtures thereof (U.S. Pat. No. 3,686,133) have been used for the purpose of improving the fluidity (water-reducing effect) of mortars and concretes in mortar and concrete works, improving the strength and durability of set mortar and concrete products, and minimizing the possibility of such set products sustaining cracks on aging. Naphthalenesulfonic acidformaldehyde condensates and salts thereof and sulfonated melamine resins and salts thereof, however, fail to manifest the expected water-reducing effect when they are added in amounts falling in the lower-limit zones of the respective specified ranges. The oxycarboxylic acids and salts thereof retard and impair the setting of mortars and concretes when they are added in substantial amounts with a view to enhancing the fluidity of mortars and concretes but fail to bring about ample water-reducing effect on mortars and concretes.

It is, therefore, an object of this invention to provide a novel copolymer, a method for the manufacture thereof, and uses thereof.

Another object of this invention is to provide a copolymer useful as a cement dispersing agent capable of manifesting an outstanding water-reducing effect, a method for the manufacture thereof, and uses thereof.

SUMMARY OF THE INVENTION

The objects described above are accomplished by a copolymer represented by the general formula I:

wherein, A denotes an alkylene group of 2 to 4 carbon atoms, the subunit $-CH_2-O-(A-O-)_aH$ comprises a plurality of oxyalkylene segments having a randomly provided number of carbon atoms in the alkylene moiety, a denotes an integer of the value of 1 to 100, $R^1$ and $R^2$ independently denote a hydrogen atom or a methyl group, X and Y independently denote a monovalent metal atom, a divalent metal atom, on ammonium group, an organic amine group or $-(B-O-)_bR^3$ (wherein, B denotes an alkylene group of 2 to 4 carbon atoms, b denotes 0 or an integer of the value of 1 to 100, and $R^3$ denotes hydrogen atom or an alkyl group of 1 to 20 carbon atoms), the sub unit $-(B-O-)_b$ comprises a plurality of oxyalkylene segments having a randomly provided number of carbon atoms in the alkylene moiety Z denotes a structural unit derived from a copolymerizable vinyl monomer, m and n each denote 1 where X and Y are each a monovalent metal atom, an ammonium group, an organic amine group or $-(B-O-)_bR^3$, or 2 where X and Y are each a divalent metal atom, and p, q and r denote numbers such that $25 \leq p \leq 75$, $25 \leq q \leq 75$, and $0 \leq r \leq 50$ are satisfied on condition that $p+q+r$ equals 100, and it is provided that the structural units involved herein may be bonded in any possible order.

The copolymer represented by the general formula I described above is manufactured by copolymerizing:

(p) moles, i.e. 25 to 75 moles of a polyalkylene glycol monoallyl ether represented by the general formula II:

wherein,
A, a and $CH_2-O-(A-O-)_a$ are as defined above, (q) moles i.e. 25 to 75 moles of a maleic acid type monomer represented by the general formula III:

wherein,
$R^1$, $R^2$, X, Y, m and n are as defined above, and (r) moles i.e. 0 to 50 moles of a vinyl monomer copolymerizable with the monomers mentioned above (providing that the total of the moles of the moles of p, q and r is 100 moles), in the presence of a polymerization initiator.

The copolymer provided by the present invention is useful as an excellent cement dispersing agent which manifests a better water-reducing effect even in a small ratio of addition than the conventional cement dispersing agents and hardly produces any appreciable adverse effects on the other properties. Further, the copolymer, when used in combination with a polysulfonic acid or salts thereof which is generally called a high-range water-reducing agent, gives rise to an economically advantageous cement dispersing agent which not only eliminates the inherent disadvantage of the aforementioned acid or salts that the water-reducing effect thereof is insufficient in an amount of addition falling in the lower-limit zone of the specified range but also curbs the acid or salt's properties of retarding the setting of mortars and concretes and entraining air into mortars and concretes. In addition, the copolymer exhibits highly desirable properties which suit a wide variety of uses such as dispersants for pigments in aqueous paints, dispersants for pigments in coated papers and dispersants for pigments in aqueous inks, chelating agents, and scale inhibitors, namely those applications in which polyacrylic acid and salts thereof and polymethacrylic acid and salts thereof have heretofore been used.

PREFERRED EMBODIMENT OF THE INVENTION

The copolymer of the present invention is a compound represented by the aforementioned general formula I. In the formula, A denotes an alkylene group of 2 to 4, preferably 2 to 3, carbon atoms, the sub unit $-CH_2-O-(A-O-)_aH$ comprises a plurality of oxyalkylene segments having a randomly provided number of carbon atoms in the alkylene moiety a denotes an integer of the value of 1 to 100, preferably 2 to 50, $R^1$ and $R_2$ independently denote a hydrogen atom or a methyl group, preferably a hydrogen atom, X and Y independently denote a monovalent metal atom, a divalent metal atom, an ammonium group, an organic amine group or $-(B-O-)_bR^3$ (wherein, B denotes an alkylene group of 2 to 4, preferably 2 to 3 carbon atoms, b denotes 0 or an integer having the value of 1 to 100, preferably 1 to 50, $R^3$ denotes hydrogen atom or an alkyl group of 1 to 20 carbon atoms, preferably a hydrogen atom), the sub unit $-(B-O-)_b$ comprises a plurality of oxyalkylene segments having a randomly provided number of carbon atoms in the alkylene moiety Z denotes a structural unit derived from a copolymerizable vinyl monomer, m and n independently denote 1 where X and Y independently denote a monovalent metal atom, a ammonium group, an organic amine group or $-(B-O-)_bR^3$, or 2 where X and Y independently denote a divalent metal atom, p, q and r denote numbers such that $25 \leq p \leq 75$, $25 \leq q \leq 75$, and $0 \leq r \leq 50$, more desirably $25 \leq p \leq 75$, $25 \leq q \leq 75$, and $0 \leq r \leq 20$, and most desirably $30 \leq p \leq 70$, $30 \leq q \leq 70$, and $r=0$ provided that $p+q+r=100$.

The copolymer represented by the general formula I is manufactured by copolymerizing (p) moles, i.e. 25 to 75 moles of a polyalkylene glycol monoallyl ether represented by the general formula II, (q) moles, i.e. 25 to 75 moles of a maleic acid type monomer represented by the general formula III, and (r) moles, i.e. 0 to 50 moles of a vinyl monomer copolymerizable with the monomers mentioned above (providing that the total of the moles of p, q and r is 100 moles), in the presence of a polymerization initiator. The copolymer thus manufactured may be further neutralized with an alkaline compound when necessary.

The polyalkylene glycol monoallyl ether is represented by the aforementioned general formula II, wherein the number of side chain units "a" of the alkylene oxide is in the range of 1 to 100, preferably 2 to 50. If the number of units "a" is 0, it gives a copolymer which is deficient in the dispersing property and the chelating property. If the number exceeds 100, the polyalkylene glycol monoallyl ether has insufficient reactivity to give a copolymer. This polyalkylene glycol monoallyl ether can be synthesized by the known method involving direct addition of an alkylene oxide of 2 to 4, preferably 2 to 3, carbon atoms in the presence of an alkali such as potassium hydroxide or sodium hydroxide or similar catalyst.

The maleic acid type monomer is represented by the aforementioned general formula III. Specific examples of the monomer include maleic acid, fumaric acid, citraconic acid, mesaconic acid, monovalent metal salts, divalent metal salts, ammonium salts, and organic amine salts of such acids and esters of these acids and alcohols represented by the general formula $HO-(B-O-)_bR^3$ (wherein, B, b and $R^3$ are as defined above), (hereinafter referred to as "alcohol III"). One member or a possible mixture of two or more members selected from the group of maleic acid type monomers represented by the general formula III can be used. In the aforementioned general formula III, $R^1$ and $R^2$ independently denote a hydrogen atom preferably, X and Y independently denote a monovalent metal atom, an ammonium group, an organic amine group, or $-(B-O-)_bR^3$ (wherein, B denotes an alkylene group of 2 to 4, preferably 2 to 3, carbon atoms, b denotes 0 or an integer of the value of 1 to 100, more desirably 0 or an integer of the value of 1 to 50, and most desirably 0 $R^3$ denotes hydrogen atom or an alkyl group of 1 to 20 carbon atoms, preferably a hydrogen atom). Where water or a water-containing solvent is used as the reaction medium, the aforementioned acid may be used in the form of an anhydride (e.g. maleic anhydride or citraconic anhydride) because the anhydride produces a free acid in the reaction system.

Examples of monovalent metals are alkali metals such as sodium and potassium. Examples of divalent metals are alkaline earth metals such as calcium and magnesium. Examples of organic amines are alkyl amines such as monomethyl amine, dimethyl amine, trimethyl amine, monoethyl amine, diethyl amine, triethyl amine, propyl amines, and butyl amines, alkanol amines such as monoethanol amine, diethanol amine, triethanol amine, monoisopropanol amine, diisopropanol amine, and dimethylethanol amine and pyridine.

Examples of vinyl monomers copolymerizable with the polyalkylene glycol monoallyl ether and the maleic acid type monomer mentioned above include acrylic acid, methacrylic acid, itaconic acid, crotonic acid, monovalent metal salts, divalent metal salts, and ammonium salts of such acids, esters of these acids and alcohols represented by the general formula $HO-(B-O-)_bR^3$ (wherein, B, b, and $R^3$ are as defined above), acrylamide, methacrylamide, diacetone acrylamide, vinyl acetate, propenyl acetate, styrene, p-methyl styrene and vinyl chloride. One member or a mixture of two or more members selected from the group of vinyl monomers satisfying the aforementioned requirement can be used.

The copolymer of the present invention has the specific structural units in a specific ratio as indicated in the aforementioned general formula. If the ratio of the specific structural units deviates from the range mentioned above, the copolymer is deficient in its dispersing property or chelating property.

In the manufacture of the copolymer represented by the general formula I, the charging ratio of the component monomers must be selected so that the produced copolymer will contain the structural units in a ratio falling within the range mentioned above. The copolymerization of the component monomers for the manufacture of the copolymer can be effected by using a polymerization initiator. The copolymerization can be performed in the form of solution polymerization or bulk polymerization, for example.

The copolymerization in a solvent can be carried out either batchwise or continuously. Examples of solvents usable for this solution polymerization include water; lower alcohols such as methanol, ethanol, isopropanol and butanol; aromatic, alicyclic, and aliphatic hydrocarbons such as benzene, toluene, xylene, cyclohexane and n-hexane; esters such as ethyl acetate; and ketone compounds such as acetone and methylethyl ketone. In due consideration of the solubility of the component monomers used as the raw material and that of the produced copolymer and the convenience of the use of the copolymer, it is preferable to use water or at least one member selected from the group of water and lower alcohols of 1 to 4 carbon atoms, among other solvents available. It is particularly advantageous for the purpose of the solution polymerization to use at least one member selected from the group of water, methanol, ethanol and isopropanol.

When the copolymerization is performed in an aqueous medium, there is used a water-soluble polymerization initiator such as, for example, ammonium or alkali metal persulfate or hydrogen peroxide. In this case, there may be used an accelerator such as, for example, sodium hydrogensulfite. When the copolymerization is performed in a lower alcohol, an aromatic, alicyclic or aliphatic hydrocarbon, ethyl acetate or a ketone compound as the solvent, there can be used a polymerization initiator selected from the group consisting of peroxides such as benzoyl peroxide and lauroyl peroxide; hydroperoxides such as cumene hydroperoxide; and aliphatic azo compounds such as azo-bis-isobutyronitrile. In this case, there may be additionally used an accelerator such as amine compound. When a mixed solvent of water with a lower alcohol is used for the solution polymerization, a suitable combination of a polymerization initiator selected from those cited above and an accelerator selected from those similarly cited above can be used. The polymerization temperature is suitably fixed depending on the particular kinds of solvent and polymerization initiator to be used. This temperature generally falls in the range of 0° to 140° C., preferably 50° to 120° C. The copolymerization is continued for a period in the range of 0.5 to 24 hours, preferably 1 to 12 hours.

The bulk polymerization is carried out at a temperature in the range of 50° to 200° C., preferably 50° to 150° C. for a period in the range of 0.5 to 24 hour, preferably 1 to 12 hours, in the presence of a polymerization initiator which is at least one member selected from the group consisting of peroxides such as benzoyl peroxide and lauroyl peroxide; hydroperoxides such as cumene hydroperoxide; and aliphatic azo compounds such as azo-bis-isobutyronitrile.

The polymerization initiators mentioned are used in an amount in the range of 0.1 to 10 weight percent, preferably 0.5 to 5 weight percent, based on the total weight of the component monomers to be used in the copolymerization.

The copolymer which is obtained in consequence of the copolymerization described above can be used in its unmodified form. Otherwise, it may be neutralized with an alkaline compound when necessary. Examples of alkaline compounds usable for this neutralization of the produced copolymer include hydroxides, chlorides, carbonates, and hydrogencarbonates of monovalent metals and divalent metals; ammonia; and organic amines. Examples of the monovalent metals, divalent metals, and organic amines are the same as already cited above.

The copolymers obtained by this invention manifests outstanding properties in a wide range of uses including cement dispersants, pigment dispersants (such as, for example, dispersants for various pigments used in aqueous paints coated papers, paper fillers, and aqueous inks), chelating agents, and scale inhibitors. Especially, the ability of these copolymers to bring about the water reducing effect on cement; to disperse a wide variety of inorganic and organic pigments in water and/or polar solvents (such as, for example, isopropanol and ethylene glycol); and to chelate or disperse polyvalent metal ions such as calcium, magnesium, zinc, and aluminum ions is outstanding.

The copolymer obtained by the present invention is advantageously applicable to various uses in water and/or polar solvents as described above. Since the polyalkylene glycol moiety of the molecule of this copolymer terminates in an OH group, the copolymer to be used in a solution does not require additional use of an antifoaming agent, because the copolymer, when the solution is vigorously stirred and consequently foamed, enables the solution to separate itself from the produced foam very quickly. In this respect, the copolymer of this invention is notably advantageous over the copolymer disclosed by British Pat. No. 1,167,524, which has its polyalkylene glycol chain terminate in a monovalent aliphatic, cycloaliphatic, aryl aliphatic, aryl, alkylaryl or acyl group having at least four carbon atoms.

Now, the present invention will be described more specifically below with reference to working examples. Of course, the present invention is not limited to these working examples. Wherever parts and percents are mentioned in these working examples, they are meant parts by weight and percents by weight invariably. The value of viscosity indicated in the working examples invariably represent those measured by use of a viscosimeter (made by Seiki Kogyo Kenkyusho and marketed under trademark designation of "Vismetron") under the conditions of 25° C. and 60 rpm.

EXAMPLE 1

A reactor made of glass and provided with a thermometer, a stirrer, a dropping funnel and a gas tube was charged with 334 parts of polyethylene glycol monoallyl ether (containing an average of five ethylene oxide units per molecule) and 100 parts of water. The mixture in the reactor was stirred and the air in the reactor was displaced with nitrogen. The stirred mixture was heated to 95° C. under a blanket of nitrogen gas. Then, an aqueous solution obtained by dissolving 139.3 parts of maleic acid and 14.2 parts of ammonium persulfate in 225 parts of water was added to the reactor over a period of 120 minutes. After the end of this addition, 14.2 parts of a 20-percent aqueous ammonium persulfate solution were added thereto over a period of 20 minutes. For 100 minutes after the end of the second addition, the interior of the reactor was held at 95° C. to bring the polymerization to completion. Subsequently, the polymerization system was neutralized by addition of a 40-percent aqueous sodium hydroxide solution to produce an aqueous solution of a copolymer (1).

Figure 1:
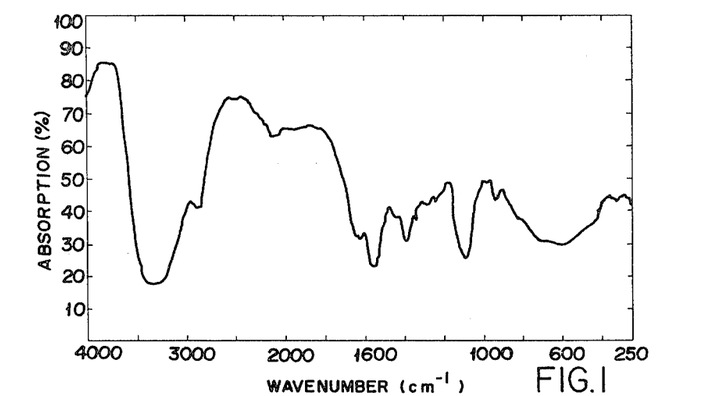
FIGS. 1 through 15 are infrared absorption spectra of copolymers prepared according to the present invention.

This aqueous solution of copolymer (1) had the pH value and viscosity as indicated in Table 1. The infrared absorption spectrum of this copolymer (1) was as shown in FIG. 1.

EXAMPLE 2

Figure 2:
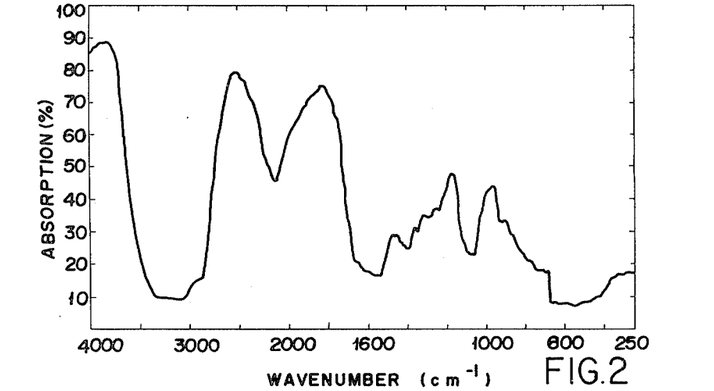

The same reactor as used in Example 1 was charged with 334 parts of polyethylene glycol monoallyl ether (containing an average of five ethylene oxide units per molecule) and 100 parts of water. The mixture of the reactor was stirred and the air in the reactor was displaced with nitrogen gas. Under a blanket of nitrogen gas, the interior of the reactor was heated to 95° C. Then an aqueous solution obtained by dissolving 117.7 parts of maleic anhydride and 14.2 parts of ammonium persulfate in 246.6 parts of water was added to the reactor over a period of 120 minutes. At the end of this addition, 14.2 parts of a 20-percent aqueous ammonium persulfate solution were added over a period of 20 minutes. For 100 minutes after the end of the second addition, the temperature of the interior of the reactor was held at 95° C. to bring the polymerization to completion. Subsequently, the reactor interior was cooled to room temperature and the polymerization system was neutralized by addition of an aqueous dispersion obtained by dispersing 89.8 parts of calcium hydroxide (in a powdered form) under stirring in 393 parts of water. Then, the neutralized polymerization system was left standing overnight. At the end of the standing, the calcium sulfate which had been precipitated during the standing was removed by centrifugal separation. Consequently, there was obtained an aqueous solution of copolymer (2). The pH value and the viscosity of this solution of copolymer (2) were as shown in Table 1. The infrared absorption spectrum of this copolymer (2) was as illustrated in FIG. 2.

EXAMPLE 3

Figure 3:
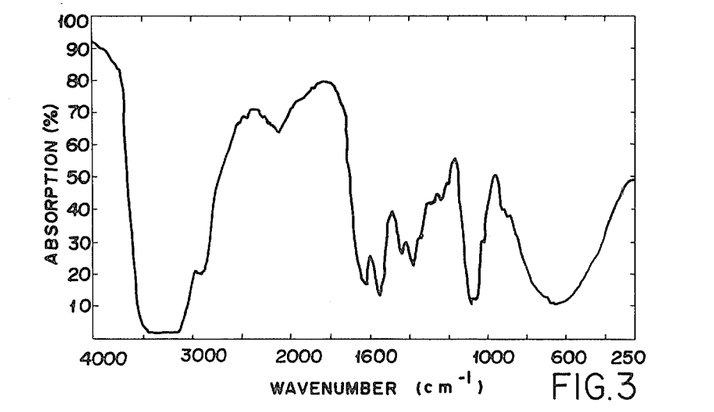

The same reactor as used in Example 1 was charged with 334 parts of polyethylene glycol monoallyl ether (containing an average of five ethylene oxide units per molecule) and 100 parts of water. The mixture of the reactor was stirred and the air in the reactor was displaced with nitrogen gas. Under a blanket of nitrogen gas, the interior of the reactor was heated to 95° C. Then, an aqueous solution obtained by dissolving 139.3 parts of maleic acid and 14.2 parts of ammonium persulfate in 225 parts of water was added to the reactor over a period of 120 minutes. At the end of this addition, 14.2 parts of a 20-percent aqueous ammonium persulfate solution were added over a period of 20 minutes. For 100 minutes after the end of the second addition, the temperature of the interior of the reactor was held at 95° C. to bring the polymerization to completion. Subsequently, the reactor interior was cooled to room temperature and the polymerization system was neutralized by addition of 894 parts of a 40-percent aqueous solution of triethanolamine (hereinafter referred to TEA) to obtain an aqueous solution of copolymer (3). The pH value and the viscosity of this solution of copolymer (3) were as shown in Table 1. The infrared absorption spectrum of this copolymer (3) was as illustrated in FIG. 3

EXAMPLE 4

Figure 4:
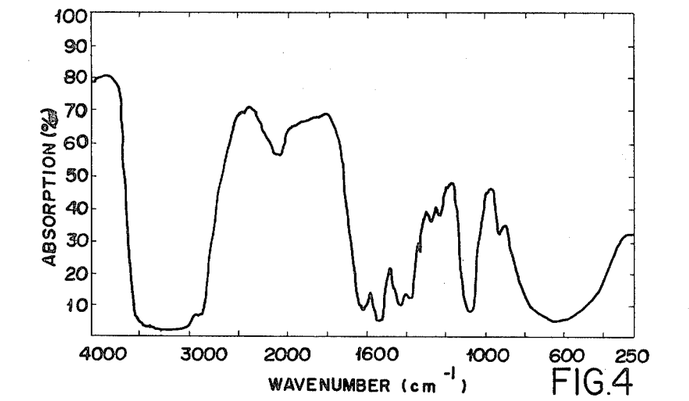

The same reactor was used in Example 1 was charged with 334 parts of polyethylene glycol monoallyl ether (containing an average of five ethylene oxide units per molecule) and 100 parts of water. The mixture of the reactor was stirred and the air in the reactor was displaced with nitrogen gas. Under a blanket of nitrogen gas, the interior of the reactor was heated to 95° C. Then, an aqueous solution obtained by dissolving 139.3 parts of maleic acid and 14.2 parts of ammonium persulfate in 225 parts of water was added to the reactor over a period of 120 minutes. At the end of this addition, 14.2 parts of a 20-percent aqueous ammonium persulfate solution were added over a period of 20 minutes. For 100 minutes after the end of the second addition, the temperature of the interior of the reactor was held at 95° C. to bring the polymerization to completion. Subsequently, the polymerization system was neutralized by addition of a 28-percent aqueous ammonia solution to obtain an aqueous sooution of copolymer (4). The pH value and the viscosity of this solution of copolymer (4) were as shown in Table 1. The infrared absorption spectrum of this copolymer (4) was as illustrated in FIG. 4

EXAMPLE 5

Figure 5:
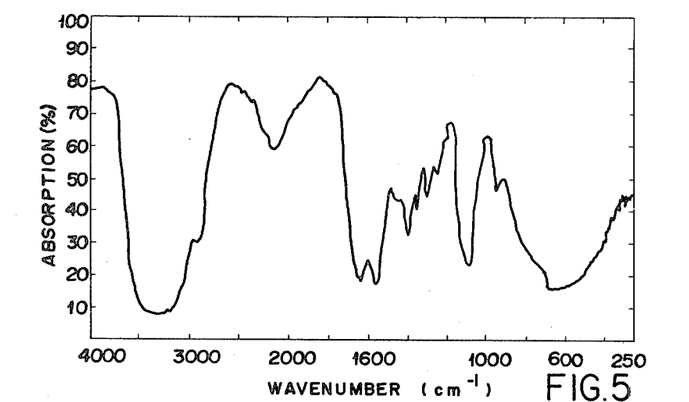

The same reactor as used in Example 1 was charged with 378.9 parts of polyethylene glycol monoallyl ether (containing an average of ten ethylene oxide units per molecule) and 133.1 parts of water. The mixture of the reactor was stirred and the air in the reactor was displaced with nitrogen gas. Under a blanket of nitrogen gas, the interior of the reactor was heated to 95° C. Then, an aqueous solution obtained by dissolving 132.3 parts of maleic acid and 9.2 parts of ammonium persulfate in 198.5 parts of water was added to the reactor over a period of 120 minutes. At the end of this addition, 23 parts of a 20-percent aqueous ammonium persulfate solution were added over a period of 60 minutes. For 60 minutes after the end of the second addition, the temperature of the interior of the reactor was held at 95° C. to bring the polymerization to completion. Subsequently, the polymerization system was neutralized by addition of a 40-percent aqueous sodium hydroxide solution to obtain an aqueous solution of copolymer (5). The pH value and the viscosity of this solution of copolymer (5) were as shown in Table 1. The infrared absorption spectrum of this copolymer (5) was as illustrated in FIG. 5

EXAMPLE 6

Figure 6:
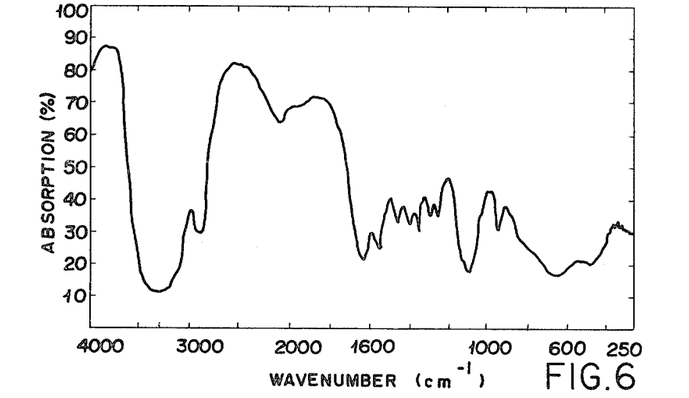

The same reactor was used in Example 1 was charged with 422.6 parts of polyethylene glycol monoallyl ether (containing an average of 20 ethylene oxide units per molecule) and 247.7 parts of water. The mixture of the reactor was stirred and the air in the reactor was displaced with nitrogen gas. Under a blanket of nitrogen gas, the interior of the reactor was heated to 95° C. Then, an aqueous solution obtained by dissolving 52.2 parts of maleic acid and 14.2 parts of ammonium persulfate in 78.3 parts of water was added to the reactor over a period of 120 minutes. At the end of this addition, 14.2 parts of a 20-percent aqueous ammonium persulfate solution were added over a period of 20 minutes. For 100 minutes after the end of the second addition, the temperature of the interior of the reactor was held at 95° C. to bring the polymerization to completion. Subsequently, the polymerization system was neutralized by addition of a 40-percent aqueous sodium hydroxide solution to obtain an aqueous solution of copolymer (6). The pH value and the viscosity of this solution of copolymer (6) were as shown in Table 1. The infrared absorption spectrum of this copolymer (6) was as illustrated in FIG. 6.

EXAMPLE 7

Figure 7:
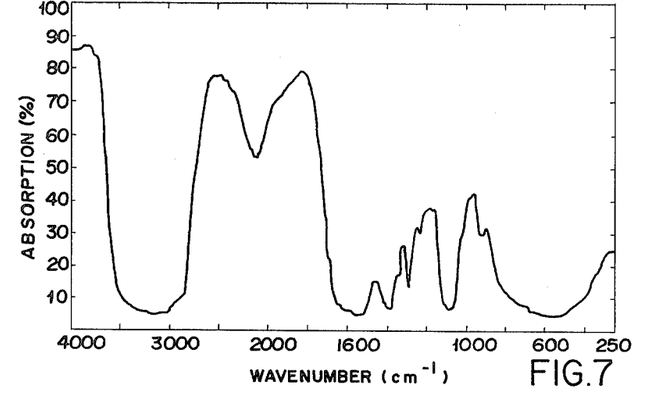

The same reactor as used in Example 1 was charged with 349 parts of polyethylene glycol monoallyl ether (containing an average of ten ethylene oxide units per molecule) and 64.7 parts of water. The mixture of the reactor was stirred and the air in the reactor was displaced with nitrogen gas. Under a blanket of nitrogen gas, the interior of the reactor was heated to 65° C. Then, an aqueous solution obtained by dissolving 116 parts of maleic acid and 24.5 parts of ammonium persulfate in 174 parts of water, 11.2 parts of ammonium persulfate in 44.8 parts of water and 25.8 parts of vinyl acetate were added respectively to the reactor over a period of 120 minutes. For 120 minutes after the end of the second addition, the temperature of the interior of the reactor was held at °C. to bring the polymerization to completion. Subsequently, the polymerization system was neutralized by addition of a 40-percent aqueous sodium hydroxide solution to obtain an aqueous solution of copolymer (7). The pH value and the viscosity of this solution of copolymer (7) were as shown in Table 1. The infrared absorption spectrum of this copolymer (7) was as illustrated in FIG. 7.

EXAMPLE 8

Figure 8:
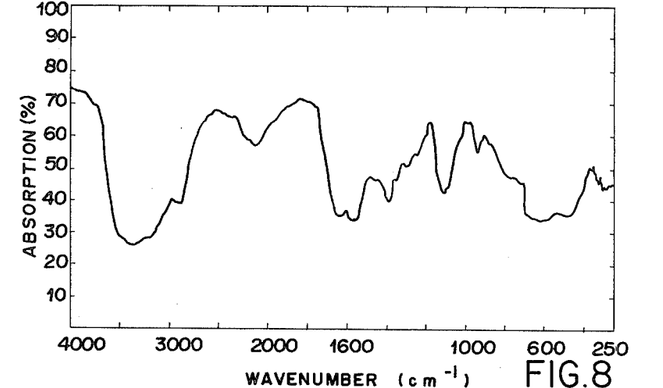

The same reactor as used in Example 1 was charged with 317.3 parts of polyethylene glycol monoallyl ether (containing an average of five ethylene oxide units per molecule) and 88.5 parts of water. The mixture of the reactor was stirred and the air in the reactor was displaced with nitrogen gas. Under a blanket of nitrogen gas, the interior of the reactor was heated to 95° C. Then, an aqueous solution obtained by dissolving 129.3 parts of maleic acid and 11.1 parts of ammonium persulfate in 209 parts of water was added to the reactor over a period of 120 minutes. At the end of this addition, 27.8 parts of a 20-percent aqueous ammonium persulfate solution were added over a period of 60 minutes. For 90 minutes after the end of the second addition, the temperature of the interior of the reactor was held at 95° C. to bring the polymerization to completion. Subsequently, the polymerization system was neutralized by addition of a 40-percent aqueous sodium hydroxide solution to obtain an aqueous solution of copolymer (8). The pH value and the viscosity of this solution of copolymer (8) were as shown in Table 1. The infrared absorption spectrum of this copolymer (8) was as illustrated in FIG. 8.

EXAMPLE 9

Figure 9:
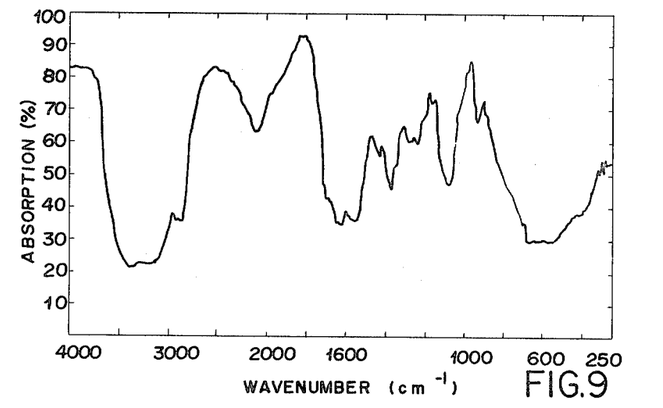

The same reactor as used in Example 1 was charged with a portion, 216 parts, of a mixed solution containing 334 parts of polyethylene glycol monoallyl ether (containing an average of five ethylene oxide units per molecule), 156 parts of monomethyl maleate, 216 parts of isopropanol and 14.7 parts of benzoyl peroxide. The mixed solution in the reactor was stirred and the air in the reactor was displaced with nitrogen gas. Under a blanket of nitrogen gas, the mixed solution was heated to its boiling point. Then, the remaining portion, 504.7 parts, of the mixed solution was added to the heated mixed solution over a period of 120 minutes. For 120 minutes after the end of this addition, the temperature inside the reactor was kept at the boiling point to continue the polymerization. Subsequently, the temperature inside the reactor was lowered to room temperature. The cooled reaction solution, with 14.7 parts of benzoyl peroxide added thereto, was heated to expel isopropanol by distillation and produce a copolymer. Then, the produced copolymer was neutralized by addition of a 40-percent aqueous sodium hydroxide solution and deionized water to afford an aqueous solution of copolymer (9). The pH value and the viscosity of the aqueous solution of this copolymer (9) were as shown in Table 1. The infrared absorption spectrum of the copolymer (9) was as illustrated in FIG. 9.

EXAMPLE 10

Figure 10:
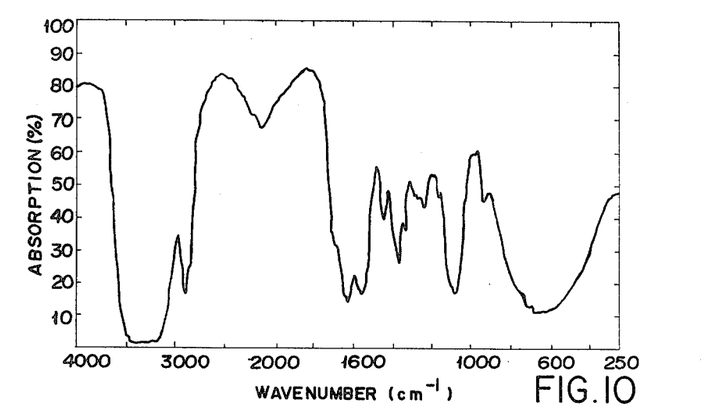

The same reactor as used in Example 1 was charged with a portion, 250.2 parts, of a mixed solution containing 222.7 parts of polyethylene glycol monoallyl ether (containing an average of five ethylene oxide units per molecule), 344.2 parts of mono-sec-alcohol (3 mol) ethoxylate of maleic acid, 250.2 parts of isopropanol and 17.0 parts of benzoyl peroxide. The mixed solution in the reactor was stirred and the air in the reactor was displaced with nitrogen gas. Under a blanket of nitrogen gas, the mixed solution was heated to its boiling point. Then, the remaining portion, 583.9 parts, of the mixed solution was added to the heated mixed solution over a period of 120 minutes. For 120 minutes after the end of this addition, the temperature inside the reactor was kept at the boiling point to continue the polymerization. Subsequently, the temperature inside the reactor was lowered to room temperature. The cooled reaction solution, with 17.0 parts of benzoyl peroxide added thereto, was heated to expel isopropanol by distillation and produce a copolymer. Then, the produced copolymer was neutralized by addition of a 40-percent aqueous sodium hydroxide solution and deionized water to afford an aqueous solution of copolymer (10). The pH value and the viscosity of the aqueous solution of this copolymer (10) were as shown in Table 1. The infrared absorption spectrum of the copolymer (10) was as illustrated in FIG. 10.

EXAMPLE 11

Figure 11:
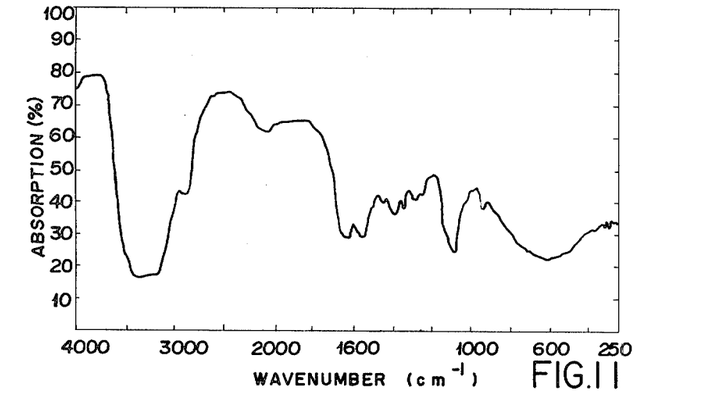

The same reactor as used in Example 1 was charged with 498.6 parts of polyethylene glycol monoallyl ether (containing an average of ten ethylene oxide units per molecule) and 116.1 parts of maleic acid. The mixed solution was stirred and the air in the reactor was displaced with nitrogen gas. Under a blanket of nitrogen gas, the mixed solution was heated to 100° C. Then, a solution prepared by dissolving 18.4 parts of benzoyl peroxide in 158.3 parts of toluene was added to the reactor over a period of 120 minutes. After the end of the addition of this solution, the mixed solution was heated to the boiling point thereof. For 120 minutes thereafter, the temperature within the reactor was kept at the boiling point to bring the polymerization to completion. Consequently, there was obtained a solid copolymer swelled with toluene. This copolymer was thoroughly neutralized by addition thereto of 500 parts of a 16-percent aqueous sodium hydroxide solution. It was then treated to expel toluene by distillation and produce an aqueous solution of copolymer (11). The pH value and the viscosity of the aqueous solution of copolymer (11) were as shown in Table 1. The infrared absorption spectrum of the copolymer (11) was as illustrated in FIG. 11.

EXAMPLE 12

Figure 12:
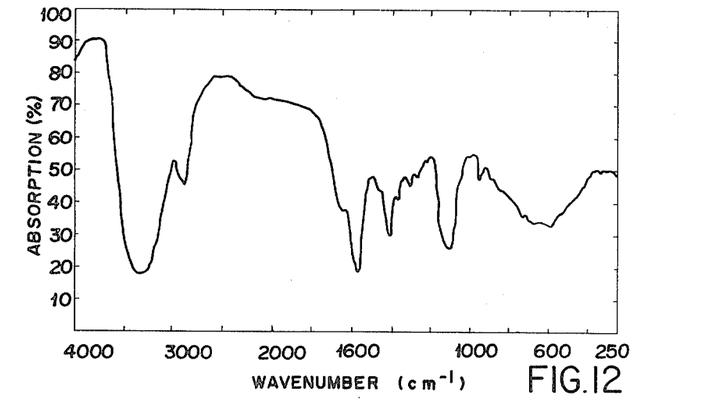

The same reactor as used in Example 1 was charged with 60.7 parts of polyethylene glycol monoallyl ether (containing an average of five ethylene oxide units per molecule) and 23.2 parts of maleic acid. The mixture in the reactor was stirred and the air in the reactor was displaced with nitrogen gas. Under a blanket of nitrogen gas, the mixture was heated to 60° C. The heated mixture was dissolved by addition of 0.84 part of benzoyl peroxide. Then, the temperature within the reactor was held at 90° C. for 60 minutes. Subsequently, the solution was cooled to 60° C. and again dissolved by addition of 0.84 part of benzoyl peroxide and heated again to 90° C. This treatment was repeated twice at intervals of 60 minutes. For 120 minutes after the end of the last-round addition of benzoyl peroxide, the temperature within the reactor was held at 90° C. to bring the polymerization to completion. Consequently, there was obtained a solid copolymer. The solid copolymer was then thoroughly neutralized by addition of 100 parts of a 16-percent aqueous sodium hydroxide solution to produce an aqueous solution of copolymer (12). The pH value and the viscosity of the aqueous solution of the copolymer (12) were as shown in Table 1. The infrared absorption spectrum of the copolymer (12) was as illustrated in FIG. 12.

EXAMPLE 13

Figure 13:
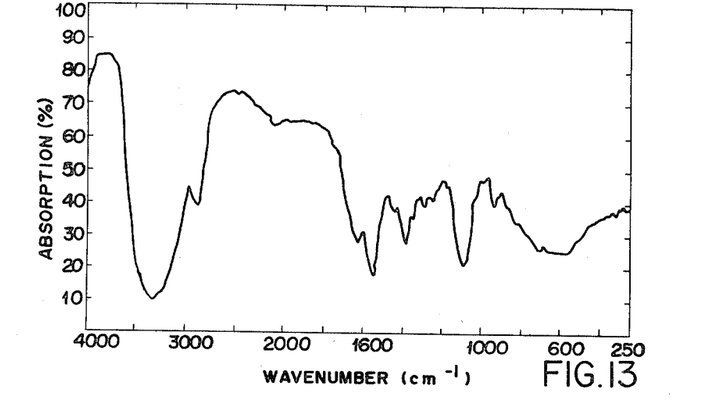

The same reactor as used in Example 1 was charged with a portion, 180.9 parts, of a mixed solution containing 498.6 parts of polyethylene glycol monoallyl ether (containing an average of ten ethylene oxide units per molecule), 116.1 parts of maleic acid, 271.3 parts of ethyl acetate and 18.4 parts of benzoyl peroxide. The mixed solution in the reactor was stirred and the air within the reactor was displaced with nitrogen gas. Under a blanket of nitrogen gas, the mixed solution was heated to the boiling point thereof. Then, the remaining portion, 723.5 parts, of the mixed solution was added to the reactor over a period of 120 minutes. For 120 minutes after the end of the addition, the temperature within the reactor was held at the boiling point to continue the polymerization. Subsequently, the temperature within the reactor was allowed to fall to room temperature. The cooled reaction mixture in the reactor, with 18.4 parts of benzoyl peroxide added thereto, was again heated to expel ethyl acetate by distillation. After most ethyl acetate had been expelled by the distillation, the reaction mixture was mixed with deionized water and subjected to continued distillation until the spent solvent was thoroughly displaced with water. The reaction mixture was then neutralized by addition of a 40-percent aqueous sodium hydroxide solution. Consequently, there was obtained an aqueous solution of copolymer (13). The pH value and the viscosity of the aqueous solution of the copolymer (13) were as shown in Table 1. The infrared absorption spectrum of the copolymer (13) was as illustrated in FIG. 13.

EXAMPLE 14

Figure 14:
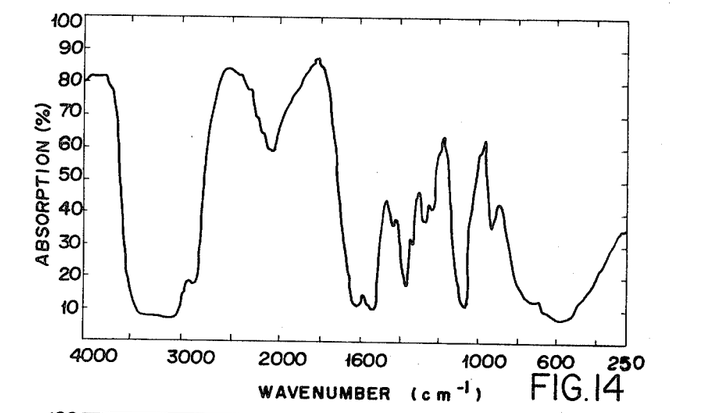

The same reactor as used in Example 1 was charged with a portion, 171.3 parts, of a mixed solution containing 149.6 parts of polyethylene glycol monoallyl ether (containing an average of ten ethylene oxide units per molecule), 34.9 parts of polypropylene glycol monoallyl ether (containing an average of five propylene oxide units per molecule), 58 parts of maleic acid, 13 parts of hydroxyethyl methacrylate, 596 parts of isopropyl alcohol and 7.7 parts of benzoyl peroxide. The mixed solution within the reactor was stirred and the air in the reactor was displaced with nitrogen gas. Under a blanket of nitrogen gas, the mixed solution was heated to the boiling point thereof. Then, the remaining portion, 687.4 parts, of the mixed solution was added to the reactor over a period of 120 minutes. For 120 minutes after the end of the addition, the temperature of the reactor interior was kept at the boiling point to continue the polymerization. Subsequently, the temperature in the reactor was allowed to fall to room temperature. The cooled reaction mixture, with 7.7 parts of benzoyl peroxide added thereto, was again heated to expel isopropyl alcohol by distillation. The reaction mixture was then neutralized by addition thereto of deionized water and a 40-percent aqueous sodium hydroxide solution. Consequently, there was obtained an aqueous solution of copolymer (14). The pH value and the viscosity of the aqueous solution of the copolymer (14) were as shown in Table 1. The infrared absorption spectrum of the copolymer (14) was as illustrated in FIG. 14.

EXAMPLE 15

Figure 15:
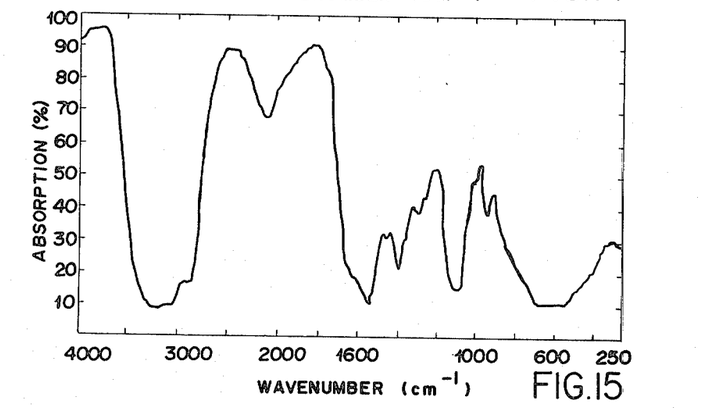

The same reactor as used in Example 1 was charged with 22.1 parts of maleic anhydride and 172.6 parts of water. The maleic anhydride in the reactor was dissolved by stirring in the water. Then, 72.7 parts of polyalkylene glycol monoallyl ether (containing an average of five ethylene oxide units and two propylene oxide units per molecule) was added to the reactor. The mixture in the reactor was stirred and the air in the reactor was displaced with nitrogen gas. The temperature of the reactor interior was raised to 80° C. Subsequently, an aqueous solution obtained by dissolving 88.3 parts of maleic anhydride in 172.9 parts of water, a solution obtained by mixing and dissolving 291.0 parts of a polyalkylene glycol monoallyl ether (containing an average of five ethylene oxide units and two propylene oxide units per molecule) and 14.4 parts of a 68-percent t-butyl hydroperoxide solution (produced by Nippon Oils and Fats Co., Ltd., and marketed under trademark designation of "Perbutyl H"), and a mixed solution of 9.8 parts of sodium formaldehyde sulfoxylate (produced by Wako Junyaku Kogyo, Ltd. and marketed under trademark designation of "Rongalite) and 22.8 parts of water were added each over a period of 120 minutes. After the end of the addition, a mixed solution of 7.2 parts of t-butyl hydroperoxide and 10 parts of methanol and a mixed solution of 4.9 parts of sodium formaldehyde sulfoxylate and 11.4 parts of water were added each over a period of 60 minutes. For 60 minutes after the end of the addition, the temperature of the reactor interior was kept at 80° C. to bring the polymerization to completion. Thereafter, the reaction mixture was heated to expel methanol by distillation and neutralized by addition thereto a 28-percent aqueous ammonia solution. Consequently, there was obtained an aqueous solution of copolymer (15). The pH value and the viscosity of the aqueous solution of the copolymer (15) were as shown in Table 1. The infrared absorption spectrum of the copolymer (15) was as illustrated in FIG. 15.

Referential Experiment 1

The same reactor as used in Example 1 was charged with 50 parts of maleic anhydride, 40 parts of polyethylene glycol monoallyl monononylphenyl ether (containing an average of 13 ethylene oxide units per molecule), 0.6 part of azo-bis isobutyronitrile, and 174 parts of toluene. The mixture in the reactor was stirred and the air in the reactor was displaced with nitrogen gas. The temperature of the reactor interior was raised to 80° C. Immediately, methyl vinyl ether in gaseous form was passed into the heated mixture in the reactor. The passage of methyl vinyl ether was stopped after the mixture ceased to absorb the ether. The resultant mixed solution containing solid copolymer was dried to hardness under vacuum, washed with ether, and dried again. Consequently, there was obtained 89 parts of copolymer. This copolymer was neutralized by addition thereto of deionized water and a 40 percent aqueous sodium hydroxide solution. Thus, there was obtained an aqueous solution of copolymer (16). The pH value and the viscosity of the aqueous solution of the copolymer (16) were as shown in Table 1.

TABLE 1

| | Copolymer | Concentration in aqueous solution (%) | pH value of aqueous solution | Viscosity of aqueous solution (cps) |
|---|---|---|---|---|
| Example 1 | Copolymer (1) | 48 | 9.5 | 203 |
| Example 2 | Copolymer (2) | 41 | 9.0 | 370 |
| Example 3 | Copolymer (3) | 50 | 8.5 | 210 |
| Example 4 | Copolymer (4) | 44 | 8.0 | 93 |
| Example 5 | Copolymer (5) | 40 | 9.0 | 61 |
| Example 6 | Copolymer (6) | 53 | 9.5 | 138 |
| Example 7 | Copolymer (7) | 52 | 9.5 | 110 |
| Example 8 | Copolymer (8) | 48 | 9.5 | 198 |
| Example 9 | Copolymer (9) | 50 | 9.5 | 130 |
| Example 10 | Copolymer (10) | 54 | 9.5 | 160 |
| Example 11 | Copolymer (11) | 50 | 10.5 | 430 |
| Example 12 | Copolymer (12) | 50 | 10.2 | 472 |
| Example 13 | Copolymer (13) | 48 | 9.5 | 225 |
| Example 14 | Copolymer (14) | 50 | 9.5 | 75 |
| Example 15 | Copolymer (15) | 52 | 8.0 | 188 |
| Referential Experiment 1 | Copolymer (16) | 5 | 9.0 | 385 |

EXAMPLE 16

(Formulation of plain mortar)

Ordinary portland cement (Sumitomo Cement)—1 part

Standard sand produced in Toyoura—2 parts

Water—0.5 part

Plain mortar (before addition of a dispersant) was prepared in the formulation shown above. Mortars containing dispersants were obtained by preparatorily dissolving a given dispersant in water in varying amounts calculated to give solid dispersant contents of 0.1 percent to 0.5 percent based on cement and adding the aqueous dispersant solutions to aliquots of plain mortar. The dispersants used herein included the copolymers (1) through (10) obtained respectively in Examples 1 through 10. For the purpose of comparison, gluconic acid salt and naphthalene-sulfonic acid-formaldehyde condensate salt were also used. The amount in which each dispersant was required to be added to adjust the flow value of the mortar to 170±5 mm, the setting time, the bending strength, and the compression strength of the resultant mortar were as shown in Table 2. The data of the flow value, bending strength, and compression strength were obtained by the testing method of Japanese Industrial Standard (JIS) R-5201(1965).

It is clear from the results given in Table 2 that the cement dispersants provided by the present invention excel the conventional cement dispersants, namely gluconic acid salt and naphthalene-sulfonic acid-formaldehyde condensate salt, in the effect of cement dispersion. It is noted that they are capable of producing mortars of high fluidity in very small ratios of addition.

TABLE 2

| Dispersant | Rate of addition (%) | Water to cement ratio | Cement | Water | Sand | Flow value (mm) | Bending strength (kg/cm$^2$) at age of 7 days | Bending strength (kg/cm$^2$) at age of 28 days | Compression strength (kg/cm$^2$) at age of 7 days | Compression strength (kg/cm$^2$) at age of 28 days | Setting property |
|---|---|---|---|---|---|---|---|---|---|---|---|
| This invention | | | | | | | | | | | |
| Copolymer (1) obtained in Example 1 | 0.15 | 50/100 | 600 | 300 | 1200 | 170 × 169 | 45.7 | 65.4 | 199 | 382 | Set within one day of mixing |
| Copolymer (2) obtained in Example 2 | 0.15 | " | " | " | " | 168 × 167 | 45.9 | 70.1 | 201 | 380 | Set within one day of mixing |
| Copolymer (3) obtained in Example 3 | 0.25 | " | " | " | " | 167 × 165 | 47.3 | 69.2 | 200 | 385 | Set within one day of mixing |
| Copolymer (5) obtained in Example 5 | 0.10 | " | " | " | " | 173 × 172 | 49.8 | 72.0 | 203 | 390 | Set within one day of mixing |
| Copolymer (6) obtained in Example 6 | 0.20 | " | " | " | " | 173 × 170 | 53.0 | 70.4 | 204 | 391 | Set within one day of mixing |
| Copolymer (7) obtained in Example 7 | 0.25 | " | " | " | " | 172 × 170 | 48.9 | 71.2 | 196 | 384 | Set within one day of mixing |
| Copolymer (8) obtained in Example 8 | 0.25 | " | " | " | " | 175 × 173 | 46.3 | 67.2 | 211 | 379 | Set within one day of mixing |
| Copolymer (9) obtained in Example 9 | 0.10 | " | " | " | " | 167 × 164 | 45.0 | 67.1 | 195 | 370 | Set within one day of mixing |
| Copolymer (10) obtained in Example 10 | 0.10 | " | " | " | " | 165 × 163 | 46.0 | 68.2 | 201 | 380 | Set within one day of mixing |
| Comparative Experiment | | | | | | | | | | | |
| Gluconic acid salt | 0.25 | " | " | " | " | 173 × 172 | — | — | — | — | No setting obtained |
| Naphthalene-sulfonic acid-formaldehyde condensate salt | 0.45 | " | " | " | " | 175 × 174 | 49.7 | 69.0 | 206 | 381 | Set within one day of mixing |
| Copolymer (16) obtained in Referential Experiment 1 | The flow value of 170 × 170 mm aimed at could not be achieved even in a rate of addition of 0.50. | | | | | | | | | | |

EXAMPLE 17

(Formulation of plain mortar)

Ordinary portland cement (Sumitomo Cement)—1 part
Standard sand produced in Toyoura—2 parts
Water—0.55 part Plain mortar (before addition of a dispersant) was prepared in the formulation shown above. Mortars containing dispersants were obtained by preparatorily dissolving a given dispersant in water in varying amounts calculated to give solid dispersant contents of 0.1 percent to 0.5 percent based on cement and adding the aqueous dispersant solutions to aliquots of plain mortar. The dispersants used herein included the copolymers (1) and (5) obtained respectively in Example 1 and Example 5 as well as naphthalene-sulfonic acid-formaldehyde condensate salt (produced by Kao Soap Co., Ltd. and marketed under trademark designation of "MYGHTY" 150), and sulfonated melamine resin salt (produced by Nisso-Master Builders Co., Ltd. and marketed under trademark designation of "NL-4000") which were commercially available as high-range water reducing agents.

The ratios of addition of these dispersants in the plain mortar and the flow values of the resultant mortars were as shown in Table 3. The flow values were determined by the testing method for flow value according to JIS R-5201 (1964).

TABLE 3

| | Combination of dispersant (Mixing ratio, %) | | Ratio of addition of dispersant (Solid content, %, based on cement) | | |
|---|---|---|---|---|---|
| | Polysulfonic acid salt (First component) | Copolymer of this invention (Second component) | 0.1% | 0.3% | 0.5% |
| | A | C | | | |
| This | 30 | 70 | 187 | 223 | 250 |
| inven- | 60 | 40 | 184 | 218 | 256 |
| tion | 90 | 10 | 172 | 200 | 246 |
| Com- | 100 | 0 | 168 | 193 | 230 |
| par- | | | | | |
| ative | | | | | |
| experi- | | | | | |
| ment | | | | | |
| | B | C | | | |
| This | 30 | 70 | 187 | 220 | 245 |
| inven- | 60 | 40 | 180 | 201 | 210 |
| tion | 90 | 10 | 168 | 182 | 192 |
| Com- | 100 | 0 | 167 | 176 | 184 |
| par- | | | | | |
| ative | | | | | |
| experi- | | | | | |
| ment | | | | | |
| | A | D | | | |
| This | 30 | 70 | 196 | 243 | 255 |
| inven- | 60 | 40 | 193 | 237 | 256 |
| tion | 90 | 10 | 180 | 210 | 253 |
| | B | D | | | |
| This | 30 | 70 | 190 | 229 | 246 |
| inven- | 60 | 40 | 184 | 210 | 213 |
| tion | 90 | 10 | 175 | 185 | 193 |

(Legend)
A: Commercially available naphthalene-sulfonic acid-formaldehyde condensate salt (produced by Kao Soap Co., Ltd. and marketed under trademark designation "MYGHTY 150").
B: Commercially available sulfonated melamine resin salt (produced by Nisso Master Builders, Ltd. and marketed under trademark designation "NL-4000").
C: Copolymer (1) obtained in Example 1.
D: Copolymer (5) obtained in Example 5.

From the results shown in Table 3 it is clear that when the polysulfonic acid salt is used in combination with the copolymer obtained by the present invention, the disadvantage of the polysulfonic acid salt, namely the deficiency of water reducing property suffered where the salt is added alone in a small amount, is completely overcome.

EXAMPLE 18

(Formulation of plain concrete)

| Cement: | Ordinary portland cement (Sumitomo Cement) |
|---|---|
| Fine aggregate: | Aggregate produced in Kinokawa River |
| Coarse aggregate: | Crushed stone produced in Takarazuka (maximum diameter 20 mm) |
| Unit consumption of cement | 300 kg/m$^3$ |
| Unit consumption of water | |
| (For plain concrete) | 174 kg/m$^3$ |
| (Water/cement ratio 58/100) | |
| (For concrete containing dispersant) | 156 kg/m$^3$ |
| (Water/cement ratio 52/100) | |
| Fine aggregate content in total aggregate | |
| (For plain concrete) | 48 percent |
| (For concrete containing dispersant) | 46 percent |

When plain concrete (before addition of dispersant) was prepared by the formulation shown above, it was found to have 8.3 cm of slump and 1.8 percent of air content. Concretes containing dispersants were obtained by preparatorily dissolving in water a varying dispersant in an amount such that a concrete produced according to the formulation shown above using the aqueous solution of the dispersant would acquire a slump of 8.0±1.0 cm and the mixing the ingredients of concrete of the aforementioned formulation and the aqueous dispersant solutions. The produced dispersant-containing concretes were tested for air content, setting time, and compression strength. The dispersants used herein were the copolymers (1), (5), (6), (8), (9) and (10) obtained respectively in Examples 1, 5, 6, 8, 9 and 10, and mixtures of the copolymer (1) and copolymer (5) with the aforementioned commercially available naphthalenesulfonic acid-formaldehyde condensate salt. For the purpose of comparison, a concrete containing the same commercially available naphthalene-sulfonic acid-formaldehyde condensate salt alone was prepared and subjected to the same test. The slump was tested by the method of JIS A-1101, the air content by the method of JIS A-1116, the compression strength by the method of JIS A-1108, and the setting time by the method of ASTM C 403-61T. The results were as shown in Table 4.

From the results shown in Table 4 it is clear that the copolymer of the present invention, when used as a cement dispersant, gives a fixed fluidity to concretes in a smaller ratio of addition than any of the known dispersants and imparts to concretes a compression strength at least equivalent to the compression strengths given by the known dispersants.

TABLE 4

| Dispersant (Note) | Ratio of addition (%) | Water/cement ratio | Fine aggregate content (%) | Unit consumption of cement (kg/m³) | Unit consumption of water (kg/m³) | Slump (cm) | Air content (%) | Setting time (o'clock-minute) From | Setting time (o'clock-minute) To | Compression strength at age of 3 days | Compression strength at age of 7 days |
|---|---|---|---|---|---|---|---|---|---|---|---|
| This invention | | | | | | | | | | | |
| C | 0.15 | 52 | 46 | 300 | 156 | 8.3 | 4.5 | 5.55 | 8.15 | 160 | 278 |
| D | 0.10 | " | " | " | " | 8.1 | 4.0 | 5.30 | 8.00 | 172 | 288 |
| Copolymer (6) obtained in Example 6 | 0.20 | " | " | " | " | 7.5 | 3.5 | 5.15 | 7.30 | 174 | 295 |
| Copolymer (8) obtained in Example 8 | 0.25 | " | " | " | " | 8.1 | 4.0 | 5.15 | 7.30 | 170 | 285 |
| Copolymer (9) obtained in Example 9 | 0.10 | " | " | " | " | 8.2 | 4.8 | 5.15 | 7.30 | 164 | 288 |
| Copolymer (10) obtained in Example 10 | 0.10 | " | " | " | " | 8.1 | 5.2 | 5.15 | 7.45 | 160 | 268 |
| A/C = 60/40 | 0.30 | " | " | " | " | 8.3 | 4.0 | 5.15 | 7.45 | 162 | 280 |
| A/D = 60/40 | 0.25 | " | " | " | " | 7.9 | 4.2 | 5.15 | 7.45 | 165 | 290 |
| Comparative experiment | | | | | | | | | | | |
| A | 0.40 | " | " | " | " | 8.1 | 4.5 | 5.15 | 7.45 | 162 | 276 |
| No addition of dispersant (Plain concrete) | — | 58 | 48 | " | 174 | 8.3 | 1.8 | 5.00 | 7.30 | 119 | 215 |

(Note)
The symbols A, C, and D used in the table have the same meanings as those of Example 17.

EXAMPLE 19

In a beaker, 750 ml of deionized water, 50 ml of a 0.58-percent aqueous calcium chloride solution, 50 ml of an aqueous solution containing as a scale inhibitor a predetermined copolymer (taken from the copolymers (1), (5), (6), (7), (8) and (14) obtained respectively in Examples 1, 5, 6, 7, 8 and 14) in a concentration of 200 ppm, and 50 ml of a 0.44-percent aqueous sodium hydrogen carbonate solution were mixed by stirring. The resultant mixed solution was adjusted to pH 8.5 by addition of a 0.01N aqueous sodium hydroxide solution. Then, the mixed solution was diluted with deionized water to a total amount of 1000 g, to prepare an aqueous solution (at 60° C.) of calcium carbonate containing sufficient calcium carbonate to give a 500%, supersaturated solution at 25° C. The supersaturated aqueous solution was divided into four aliquots, which were placed in separate glass vials, stoppered airtightly, and left standing at 60° C. After intervals of 5, 10, 20 and 40 hours, samples were taken from the vials, cooled to 25° C., passed each through a quantitative filter paper, No. 5C, made by Toyo Filter Paper Co., and assayed by atomic absorption analysis (422.7 nm) for residual calcium ion to determine the amount of calcium carbonate precipitated.

For the purpose of comparison, the procedure described above was repeated by using the commercially available polysodium acrylate (having a molecular weight of 5000) as a scale inhibitor. Also, a blank test using no scale inhibitor was carried out. The results were as shown in Table 5.

It is clear from the results of Table 5 that the copolymer of the present invention functions highly effectively as a scale inhibitor.

TABLE 5

| | Scale inhibitor | Amount of CaCO₃ precipitated from sample (ppm) after intervals of 5 hours | 10 hours | 20 hours | 40 hours |
|---|---|---|---|---|---|
| This invention | Copolymer (1) obtained in Example 1 | 5 | 8 | 10 | 10 |
| | Copolymer (5) obtained in Example 5 | 5 | 10 | 10 | 10 |
| | Copolymer (6) obtained in Example 6 | 7 | 10 | 13 | 13 |
| | Copolymer (7) obtained in Example 7 | 6 | 8 | 10 | 11 |
| | Copolymer (8) obtained in Example 8 | 4 | 7 | 7 | 7 |
| | Copolymer (14) obtained in Example 14 | 5 | 7 | 8 | 8 |
| Comparative experiment | Commercially available polysodium acrylate (molecular weight 5000) | 5 | 10 | 13 | 13 |
| | No scale inhibitor used | 43 | 58 | 70 | 88 |

EXAMPLE 20

In a beaker having an inner volume of 1 liter, 700 ml of sea water was placed and a predetermined component (taken from the copolymers (1), (5), (6), (7), (8) and (14) obtained respectively in Examples 1, 5, 6, 7, 8 and 14) was added thereto in an amount giving a copolymer concentration of 5.0 ppm. As a heat source, a pipe heater (100 V, 500 W) was immersed in the sea water. The sea water was stirred and concentrated through evaporation by the heat from the pipe heater. While the sea water was vaporized and concentrated, it was continuously replenished with the sea water separately prepared to contain the copolymer in a concentration of 5.0 ppm. At the time that the solids concentration reached a level 4 times the original level, the pipe heater was examined to determine the amount of scale deposited to the surface thereof. For the purpose of comparison, the procedure described above was repeated by using polysodium acrylate (having a molecular weight of 5000) available on the market as a scale inhibitor. Besides, a blank test using no scale inhibitor was carried out. The results were as shown in Table 6.

From the results of Table 6 it is clear that the copolymer of the present invention functions quite effectively as a scale inhibitor.

TABLE 6

|  | Scale inhibitor | Amount of scale deposited (mg/cm$^3$) |
|---|---|---|
| This invention | Copolymer (1) obtain in Example 1. | 0.07 |
|  | Copolymer (5) obtain in Example 5. | 0.09 |
|  | Copolymer (6) obtain in Example 6. | 0.07 |
|  | Copolymer (7) obtain in Example 7. | 0.10 |
|  | Copolymer (8) obtain in Example 8. | 0.08 |
|  | Copolymer (14) obtain in Example 14 | 0.07 |
| Comparative experiment | Commercially available polysodium acrylate (having molecular weight of 5000) | 0.45 |
|  | No scale inhibitor used | 1.05 |

EXAMPLE 21

Aqueous emulsion paint pastes were prepared by using copolymers (1), (4), (8) and (15) obtained respectively in Examples 1, 4, 8 and 15. Then, aqueous emulsion paints were prepared by mixing the paint pastes mentioned above with a paint emulsion. The produced paints were tested for timecourse change of viscosity and for gloss of their applied coats. For the purpose of comparison, an aqueous emulsion paint paste and an aqueous emulsion paint were prepared by using diisobutylene-maleic acid copolymer (produced by Rohm and Haas Co., and marketed under trademark designation of Tamol 731) commercially available as a dispersant, and they were tested for time-course change of viscosity and for gloss of applied coat. The formulation for the aqueous emulsion paint paste and that for the aqueous emulsion paint were as shown below.

(Formulation for aqueous emulsion paint paste)

| Aqueous dispersant solution (24 percent) | 29.9 parts |
|---|---|
| Water | 90.8 parts |
| Wetting agent (produced by Kao-Atlas Industry Co., and marketed under trademark designation of "Emulgen 909") | 7.1 parts |
| Ethylene glycol | 158.5 parts |
| Titanium dioxide (produced by Ishihara Sangyo K.K., and marketed under trademark designation of "R-930") | 871.2 parts |
| Thickener (produced by Union Carbide Chemicals, marketed under trademark "CELLOSIZE QP-4400(H)" and used in the form of a 2-percent aqueous solution) | 36.0 parts |
| Total | 1193.5 parts | cl (Formulation for aqueous emulsion paint)

| Aqueous emulsion paint paste | 68.9 parts |
|---|---|
| Acryl emulsion (produced by Nippon Shokubai Kagaku Kogyo Co., Ltd. marketed under trademark designation of "Acryset EMN-210E," and used in the form of a 50-percent aqueous dispersion) | 100.0 parts |
| Film-forming aid (produced by Chisso Chemical Industry Co., and marketed under trademark designation of "CS-12") | 6.5 parts |
| Total | 175.4 parts |

From the results of Table 7, it is clear that when the copolymer of this invention is used as a pigment dispersant, it produces a paint paste having low viscosity and abounding with fluidity. It is also clear from the results of Table 8 and Table 9 that the aqueous emulsion paint prepared from the paint paste using the copolymer of this invention as a pigment dispersant exhibits outstanding viscosity-stabilizing property and film gloss.

TABLE 7

| | | Viscosity (B type viscosimeter at 25° C. and 60 rpm) | |
|---|---|---|---|
| Paste No. | Dispersant | Immediately after preparation (cps) | One day after preparation (cps) |
| This invention | | | |
| I | Copolymer (1) obtained in Example 1. | 1774 | 2000 |
| II | Copolymer (4) obtained in Example 4 | 1714 | 1754 |
| III | Copolymer (8) obtained in Example 8 | 2020 | 2120 |
| IV | Copolymer (15) obtained in Example 15 | 1840 | 1896 |
| Comparative experiment | | | |
| V | Na salt of diisobutylene-maleic anhydride copolymer (Note 1) | 3540 | 4490 |

(Note 1)
Commercially available compound (produced by Rohm and Haas Co., and marketed under trademark designation of "Tamol 731").

TABLE 8

| | | | Time-course change of paint viscosity (B type viscosimeter at 25° C. and 60 rpm) | | | |
|---|---|---|---|---|---|---|
| | | | At 25° C. Immediately after preparation | At 50° C. (for accelerated aging) (Note 2) After interval of | | |
| | Paint No. | Paste No. | | One day | Three days | Seven days |
| This invention | A | I | 342 | 668 | 880 | 1100 |
| | B | II | 319 | 328 | 412 | 462 |
| | C | III | 356 | 682 | 902 | 1150 |
| | D | IV | 346 | 382 | 536 | 620 |

TABLE 8-continued

| | | Time-course change of paint viscosity (B type viscosimeter at 25° C. and 60 rpm) | | | |
|---|---|---|---|---|---|
| | | At 25° C. Immediately after preparation | At 50° C. (for accelerated aging) (Note 2) After interval of | | |
| Paint No. | Paste No. | | One day | Three days | Seven days |
| Comparative experiment E | V | 445 | 940 | 980 | 1042 |

(Note 2)
The viscosity was measured after the sample was allowed to cool off to 25° C.

TABLE 9

| | Coat No. | Paint No. | Gloss (60°) (measured three days after application to substrate) (Note 3) |
|---|---|---|---|
| This invention | α | A | 81.6 |
| | β | B | 80.3 |
| | γ | C | 81.2 |
| | δ | D | 80.6 |
| Comparative experiment | ε | E | 79.0 |

(Note 3)
The gloss was measured with a gloss meter (Model GM-3M) made by Murakami Shikisai-Gijutsu Kenkyusho.

What is claimed is:

1. A copolymer represented by the general formula:

wherein, A denotes an alkylene group of 2 to 4 carbon atoms, the a denotes an integer of the value of 1 to 100, the subunit —$CH_2$—O—(A—O)—$_a$H comprises a plurality of oxyalkylene segments having a randomly provided number of carbon atoms in the alkylene moiety, $R^1$ and $R^2$ independently denote hydrogen atoms or a methyl group, X and y independently denote a monovalent alkali metal atom, a divalent alkaline earth metal atom, ammonium group, an organic amine group, or (—B—O)—$_bR^3$ (wherein, B denotes an alkylene group of 2 to 4 carbon atoms, b denotes O or an integer of the value of 1 to 100, and $R^3$ denotes a hydrogen atom or an alkyl group of 1 to 20 carbon atoms), the sub-unit —(-B—O—)$_b$ comprises a plurality of oxyalkylene segments having a randomly provided number of carbon atoms in the alkylene moiety, Z denotes a structural unit derived from a copooymerizable vinyl monomer, m and n each denote 1 where X and Y are each a monovalent alkali metal atom, an ammonium group, an organic amine group or (—B—O—)$_bR^3$, or 2 where X and Y are each a divalent alkaline earth metal atom, and p,q, and r denote numbers such that $25 \leq p \leq 75$, $25 \leq q \leq 75$, and $0 \leq r \leq 50$ are satisfied on condition that p+q+r equals 100, and it is provided that the structural units involved herein may be bonded to each other in random order.

2. The copolymer according to claim 1, wherein p, q, and r are numbers satisfying $25 \leq p \leq 75$, $25 \leq q \leq 75$, and $0 \leq r \leq 20$.

3. The copolymer according to claim 2, wherein p, q, and r are numbers satisfying $30 \leq p \leq 70$, $30 \leq q \leq 70$, and r=0.

4. The copolymer according to claim 1, wherein A denotes an alkylene group of 2 to 3 carbon atoms, a denotes an integer of the value of 2 to 50, and $R^1$ and $R^2$ independently denote a hydrogen atom, and X and Y independently denote a monovalent alkali metal atom, a divalent alkaline earth metal atom, an ammonium group, an organic amine group, hydrogen atom or an alkyl group of 1 to 20 carbon atoms.

5. The copolymer according to claim 4, wherein A denotes an ethylene group, a denotes an integer of the value of 2 to 50, $R^1$ and $R^2$ independently denote a hydrogen atom, and X and Y independently denote a member selected from the group consisting of hydrogen, sodium, potassium, calcium, ammonium and organic amine groups.

6. A method for the manufacture of a copolymer represented by the general formula I of claim 1 (wherein A, a, the (—A—O—)$_a$ chain, $R^1$, $R^2$, X, Y, m, n, p, q and r are as defined in claim 1), which comprises copolymerizing:

(p) moles of a polyalkylene glycol monoallyl ether represented by the general formula II:

(wherein A,a, and (—A—O—)$_a$ are as defined above and p is an integer from 25-75), (q) moles of a maleic acid type monomer represented by the general formula III:

(wherein $R^1$, $R^2$, X,Y, m, and n are as defined above and q is an integer from 25 to 75), and (r) moles of a vinyl monomer copolymerizable with the monomers mentioned above wherein r is 0 4 an integer from 1 to 50 (provided that p+q+r is 100, in the presence of a polymerization initiator.

7. The method according to claim 6, wherein p, q, and r are numbers satisfying $25 \leq p \leq 75$, $25 \leq q \leq 75$, and $0 \leq r \leq 20$.

8. The method according to claim 7, wherein p, q, and r are numbers satisfying $30 \leq p \leq 75$, $30 \leq q \leq 70$, and r=0.

9. The method according to claim 6, wherein A denotes an alkylene group of 2 to 3 carbon atoms, a denotes an integer of the value of 2 to 50, and $R^1$ and $R^2$ independently denote a hydrogen atom, and X and Y independently denote a monovalent metal atom, a divalent metal atom, ammonium group, an organic amine group, hydrogen atom or an alayl group of 1 to 20 carbon atoms.

10. The method according to claim 9, wherein A denotes an ethylene group, a denotes an integer of the value of 2 to 50, $R^1$ and $R^2$ independently denote a hydrogen atom, and X and Y independently denote a member selected from the group consisting of hydrogen sodium, potassium, calcium, ammonium and organic amine groups.

11. The method according to claim 6, wherein the reaction is carried out in a liquid reaction medium.

12. The method according to claim 11, wherein the liquid reaction medium is water or an organic solvent.

13. The method according to claim 12, wherein the liquid reaction medium is water.

14. The method according to claim 11, wherein the liquid reaction medium is one member selected from the group consisting of lower alcohols, aromatic, alicyclic, and aliphatic hydrocarbons, esters, and ketones.

15. The method according to claim 11, wherein the liquid reaction medium is at least one solvent selected from the group consisting of water and aliphatic alcohols of 1 to 4 carbon atoms.

16. The method according to claim 6, wherein the reaction is carried out in the absence of a solvent.

17. The method according to claim 6, wherein the produced copolymer is further neutralized with an alkaline compound.

18. The method according to claim 13, wherein the produced copolymer is further neutralized with an alkaline compound.

19. The method according to claim 15, wherein the produced copolymer is further neutralized with an alkaline compound.

20. The method according to claim 11, wherein the reaction is carried out at a temperature in the range of 0° to 140° C.

21. The method according to claim 16, wherein the reaction is carried out at a temperature in the range of 50° to 150° C.

* * * * *